United States Patent Office 3,419,577
Patented Dec. 31, 1968

3,419,577
ORGANIC PEROXIDES
Ernst Bieckert, Limburgerhof, Germany, and Rolf Kallischnigg and Klaus Gensel, Liestal, Switzerland, assignors to Knoll A.G., Ludwigshafen (Rhine), Germany
No Drawing. Filed Jan. 31, 1964, Ser. No. 341,748
Claims priority, application Germany, Feb. 1, 1963, K 48,824; Dec. 21, 1963, K 51,707
9 Claims. (Cl. 260—338)

ABSTRACT OF THE DISCLOSURE

Acyclic and cyclic organic peroxides with internal peroxide groups characterized by higher than usual thermal stability and lower than usual volatility.

---

This invention relates to novel organic peroxides that are useful, inter alia, in the cross-linking of polymeric materials, such as rubber and various synthetic polymers, and to methods of preparing said peroxides.

It is well known that organic peroxides play an important part in the vulcanization of rubber and the cross-linking of various polymers. Tertiary alkyl peroxides, aromatic compounds such as dicumyl peroxide and, more recently, peroxides such as 2,5-dimethyl-2,5-di-(tert. butylperoxy) hexane and 2,5-dimethyl-2,5-di-(tert. butylperoxy) hex-3-yne have been proposed for this purpose. To achieve a desirably uniform activity on the polymeric material, it is of course necessary to effect a uniform distribution therein. This can usually be accomplished only if the polymeric material is in a sufficiently plastic state. For this reason, optimum temperatures for the distribution of organic peroxide often exceed 100° C., mostly even 150° C., depending on the softening point of the polymeric material and the quantity of filler to be added.

The known peroxides have the disadvantages of decomposing at relatively low temperatures and having half-life values that are so short as to create great difficulties because of premature reactivity at the temperatures required to achieve and maintain a plastic state. In addition, the known peroxides often have a tendency to ignite or explode, and many have an undesirably high volatility.

In contrast, the peroxides of this invention have significantly greater stability in that their decomposition temperatures are appreciably higher, and their volatilities are appreciably lower, than those of the known peroxides, advantages which make it possible to obtain uniform and homogeneous distribution of the peroxides throughout polymeric materials at optimum working temperatures without incurring the risk of premature reaction or undesirable side reactions. These peroxides, because of their higher decomposition temperatures, have the most desirable advantage permitting accurate control over the liberation of their peroxidal activity.

The novel peroxides of the invention are mixtures of compounds of the formula (I) 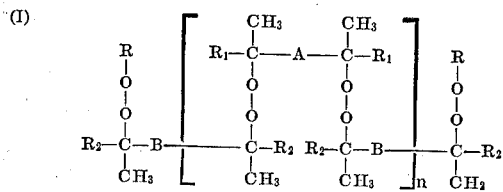

and cyclic compounds of the formula (II) 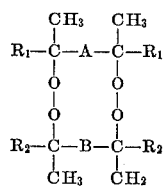

in which A and B represent divalent —CH$_2$—CH$_2$—, —CH=CH— and —C≡C— groups, R is a tertiary alkyl, preferably a tertiary lower alkyl of four to about seven carbon atoms, R$_1$ and R$_2$ represent alkyl groups of one to three carbon atoms, and $n$ represents an integer from 1 to 5, inclusive.

The peroxides of Formula I are obtained, as described hereinafter, in the form of mixtures of compounds that differ from one another as to the value of $n$, i.e., their degree of oligomerization, if any. They can be isolated into individual compounds, e.g., by vacuum distillation. However, it is usually unnecessary to effect such separation because the mixtures are entirely suitable as such for most industrial applications.

In accordance with one embodiment of the method of this invention, preparation of peroxides of Formula I is favored by (1) etherifying one or more diols of the formula (III) 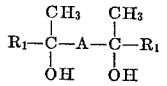

with a molar excess of one or more dihydroperoxides of the formula (IV) 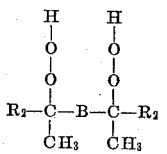

and (2) reacting the terminal hydrogen peroxide groups of the resulting compounds of the formula (V) 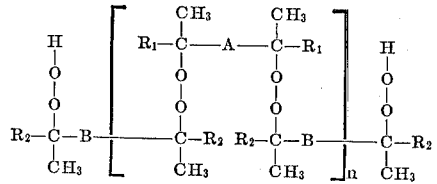

with one or more tertiary alcohols of the formula R—OH, or one or more corresponding iso-alkenes in hydrogen peroxide as described in Houben-Weyl, "Methoden der Organischen Chemie," 4th Edition (1952), volume VIII, page 37.

Tertiary lower alkyl alcohols that are particularly suited in this step include tert. butyl-, tert. amyl- and triethylmethyl alcohols. Correspondingly suitable iso-alkenes include, e.g., isobutylene and isoamylene.

In accordance with another embodiment of the method of this invention, preparation of peroxides of Formula I is favored by (1) etherifying one or more dihydroperoxides of the formula (VI)
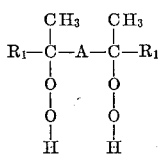

with a molar excess of one or more diols of the formula (VII)
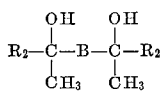

and (2) either (a) reacting the terminal hydroxyl groups of the resulting compounds of the formula (VIII)
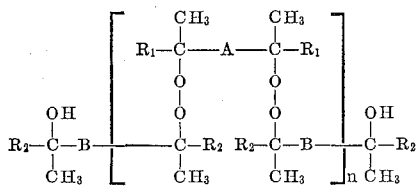

with a tertiary alkyl peroxide of the formula

R—O—O—H or (b) first converting them to hydrogen peroxide groups and then converting said peroxide groups into tertiary alkyl peroxide groups as explained with reference to the first embodiment.

The preparation of the cyclic organic peroxides of Formula II is essentially similar, being favored by reacting the initial etherification reactants in equimolar amounts. Since the resulting dodecacyclic compounds have no terminal peroxide or hydroxyl groups, there is no need to convert such groups to tertiary alkyl peroxide groups.

As a practical matter, it is found that mixtures of compounds of Formulae I and II are generally obtained, the open chain compounds of Formula I being favored by using a molar excess of one reactant or the other and the cyclic compounds of Formula II being favored by using substantially equimolar amounts. The two types of compounds are readily separable from one another by treatment of the mixture with an alkali metal hydroxide.

It is also possible to prepare the peroxides, and it is within the scope of the invention, to substitute in whole or in part for the diols of Formulae III and VII as starting materials, a diene of the formula (IX)
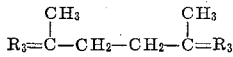

or (X)
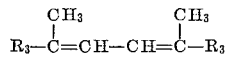

or a combination thereof, in which $R_3$ represents an alkyl group of one to three carbon atoms, at least one of the divalent groups represented by A and B in Formulae I and II then being —$CH_2$—$CH_2$—. Examples of dienes suitable for this embodiment of the invention are: 2,5-dimethyl-hexa-1,5-diene, 2,5 - dimethyl-hexa-2,4-diene, 3,6-dimethyl-octa-2,6-diene, and 3,6 - dimethyl - octa - 3,5-diene.

The etherification of such dienes with peroxides of Formulae IV or VI can be readily accomplished by introducing the two reactants to a concentrated perchloric acid solution to which an organic acid, such as glacial acetic acid, may be added if desired. Sulfuric acid, p-toluene sulfonic acid or concentrated phosphoric acid may be used as etherification agent in place of perchloric acid. Suitable solvents for the perchloric acid or alternative etherification agents include inert organic compounds, such as methylene chloride, dichloromethane and chloroform. The etherification reaction takes place at room temperature and moderately elevated temperature.

Furthermore, the organic peroxides of the invention can be prepared by reacting alkali metal salts of the free hydroperoxides of Formulae IV and VI with the diols, or esters, halides and hydrogen sulfates of the diols of Formulae III and VII.

The etherification of hydrogen peroxide groups with the alcohol function can readily be performed, as will become evident from the example forming part of this disclosure, at normal (room) temperature or moderately elevated temperatures in organic solvents such as hydrocarbons, chloroform, methylene chloride, dioxane and glacial acetic acid, and in the presence of etherification catalysts such as perchloric acid, sulfuric acid, p-toluene sulfonic acid and phosphoric acid.

Etherification of terminal hydrogen peroxide groups, e.g., of the intermediate compounds of Formula V, whose isoalkenes takes place readily as an addition reaction in the presence of the aforementioned catalysts and under the same reaction conditions. It is, therefore, possible to carry out such etherification immediately after the preceding step without first isolating the intermediate compounds.

Intermediate products having free tertiary hydroxyl groups, e.g., those of Formula VIII, can also first be converted to the corresponding dihydroperoxides by reaction with hydrogen peroxide, if desired in the presence of acid catalysts such as sulfuric acid. These hydroperoxides can then, as described, be transformed into the desired end products by reaction with tertiary alcohols of the formula R—OH or corresponding isoalkenes.

The initial diols of Formulae III and VII are obtainable by condensation of acetylene with acetone, methylethyl ketone or methylisopropyl ketone in the presence of potassium hydroxide, as described by Reppe. The alkyne diols thus obtained as primary addition product can then, as and if desired, be hydrogenated to the corresponding alkene diols and alkane diols in the presence of metal catalysts of Group VIII of the Periodic System of Elements. Cis- and trans-isomers are equally useful.

The initial dihydroperoxides of Formulae IV and VI are readily obtainable by oxidation of the aforementioned diols, e.g., by oxidation with hydrogen peroxide in the presence of sulfuric acid.

Example 1

(A) A mixture of 100 g. 2,5-dimethyl-2,5-dihydroperoxy-hex-3-yne and 50.4 g. 2,5-dimethylhexane-2,5-diol (in a molar ratio of 1:0.6) is slowly added, in the course of several hours and while stirring, to 200 cc. glacial acetic acid containing 7.1 g. of 70% perchloric acid as etherification catalyst. The temperature is maintained at about 20° C. initially and at about 30° C. towards the end of the reaction. After the addition is complete, the mixture is stirred for an additional three hours at 50 to 55° C. to insure completion of the reaction.

The progress of the etherification can be followed and controlled by testing samples of the reaction mixture for free hydrogen peroxide groups by means of a differential, iodometric determination of the active oxygen content, or by the triethylarsine method of Horner and Jürgens, as described in Angewandte Chemie, vol. 70 (1958), pages 266–268.

The resulting solution is then cooled, an additional 3.5 g. of 70% perchloric acid are added, and 65 g. isobutylene are introduced at 30° C. The mixture is stirred while warming it slowly to 50 to 55° C. until a sample tested with ferric thiocyanate ceases to show a hydrogenperoxide reaction.

The reaction solution is diluted with 400 cc. water. The separated oil is taken up in methylene chloride and washed with a saturated sodium bicarbonate solution for removal of acetic and perchloric acid. The methylene chloride solution is then dried with magnesium sulfate, the methylene chloride is distilled off under a slight vacuum and the residue is subjected to a vacuum of at least 0.02 mm. Hg at an internal temperature of 40° C. for one hour.

The resulting product is a light yellow, clear, moderately viscous liquid containing 12.1% active oxygen and having the formula

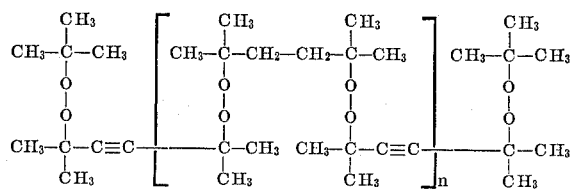

wherein *n* is 1 to 5.

(B) By substituting 2,5-dimethyl-hex-3-yne-2,5-diol for the 2,5-dimethylhexane-2,5-diol used in the foregoing procedure, a product is obtained which has an active oxygen content of 11.72% and the formula

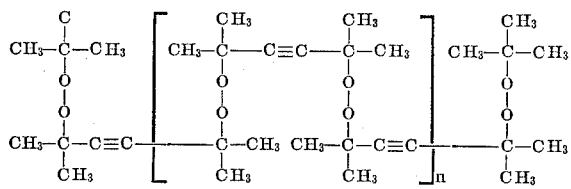

in which *n* is 1 to 5, whereas the use of 2,5-dialkylhexane-2,5-diols such as 2,5-dimethylhexane-2,5-diol as starting material can result in a somewhat reduced yield due to intramolecular etherification thereof into the corresponding 2,2,5,5-tetraalkyl-tetrahydrofurans, the use of the corresponding hexynediols does not involve such a side reaction.

Example 2

By repeating the prcedure of Example 1A but starting with 2,5-dimethyl-2,5-dihydroperoxy-hex-3-yne and 2,5-dimethylhexane-2,5-diol in the inverse molar ratio of 0.6:1 (with 71.5 g. of the hexyne and 100 g. of the diol) and then reacting the hydroxyl groups that are thus formed with excess tertiary butyl hydrogen peroxide in acetic acid in the presence of perchloric acid or sulfuric acid as therification catalyst, the product obtained is one having an active oxygen content of 8.84% and the formula

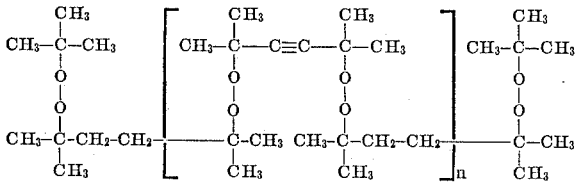

*n* being 1 to 5.

Example 3

A mixture of 100 g. 2,5-dimethyl-2,5-dihydroperoxy hex-3-yne and 81.5 g. 2,5-dimethylhex-3-yne-2,5-diol (in a molar ratio of 1:1) is slowly added, in the course of several hours and at 50° C., to a well-stirred mixture of 1000 cc. glacial acetic acid and 43 g. of 70% perchloric acid. After the addition is complete, the mixture is stirred for another hour at 60° C. to insure completion of the reaction.

The perchloric acid is neutralized by addition of 45 g. sodium acetate-trihydrate, and the reaction solution is concentrated to about one-third its original volume under vacuum on a water bath at 40° C. and diluted with 250 to 300 cc. water. Upon cooling, white crystals are precipitated. These are filtered off and the filtrate is diluted with an additional liter of water. The oil thus separated is taken up in pentane and, to separate open-chain side-reaction products, twice shaken up with 40% sodium hydroxide while cooling and then stirred for three hours with fine powdered sodium hydroxide. This is then filtered, the pentane is drawn off by suction and the residue is fractionated. A crude fraction is obtained in the form of a weakly yellow oil which partially crystallizes and has a boiling point of 40 to 60° C. at 0.09 mm. Hg. This distillate is dissolved in methanol and allowed to crystallize while cooled.

The crystalline portion is filtered off, added to the crystals first obtained, and recrystallized from benzine. The resulting 3,3,6,6,9,9,12,12-octamethyl-1,2,7,8-tetraoxa-cyclododeca-4,10-diyne is a white, crystalline product melting at 177 to 178° C., containing 11.7% active oxygen (theoretical 11.4%) as formed by iodometric peroxide determination, and having the formula

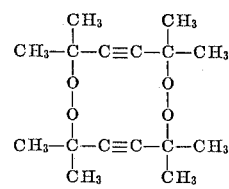

Molecular weight was 274 to 288 (calculated 280.37). A differential determination of the compound by the aforementioned method of Horner and Jürgens indicates it to be a dialkyl peroxide. The compound is readily soluble at 20° C. in benzene, ether, acetone, acetic acid esters and halogenated hydrocarbons, slightly soluble in glacial acetic acid, ethanol and benzine, and insoluble in methanol and water. It recrystallizes from a melt at 180° C. and decomposes at above 185° C. with foaming.

To isolate an oily modification of this compound, a solution of the crude fraction in methanol is concentrated and the residue is distilled. Thus one obtains a weakly yellow oil having a boiling point of 43° C. to 0.02 mm. Hg. It likewise has the characteristics of a dialkylperoxide, has an iodometrically determined content of 10.9% active oxygen and a molecular weight of 278 to 285 (theoretical: 280.37).

The unexpectedly higher and desirable decomposition temperatures of the peroxides of this invention, which are in large part responsible for the advantages involved in their use with polymeric materials having softening temperatures of the order of 100° C. and even 150° C. or higher before cross-linking or vulcanization, are illustrated by the crystalline and oily modifications of the compound prepared in accordance with this example. The following table lists the percentages of peroxide groups in the compound of this example and in three typical known organic peroxides that are decomposed at the temperatures and in the intervals of time indicated. To obtain these values, the various peroxides are heated to the indicated temperatures in tetrahydronaphthalene (tetralin) and their extent of decomposition is determined:

| Peroxide | Temperature | | |
|---|---|---|---|
| | 140° C. | 160° C. | 180° C. |
| Crystalline product of Example 3 | 8–10% in 8 hrs | 45–50% in 8 hrs | 50–54% in 2 hrs. |
| Oily product of Example 3 | 5–10% in 8 hrs | 48–52% in 8 hrs | 62–65% in 2 hrs. |
| Dicumyl peroxide; dimethyl-2,5-di-(tert. butylperoxy) hexane. | | 50% in 4–7 min | |
| 2,5-dimethyl-2,5-di-(tert. butylperoxy) hex-3-yne. | | 50% in 12–15 min | |
| Tert. butylperoxide; tert. butyl-cumyl peroxide. | | 50% in 22–25 min | |

It is also apparent from the formulae of the peroxides of the invention, that they have the advantage of containing the same two-carbon atom building blocks as, e.g., polyethylene, vinyl polymers and the like.

Example 4

By substituting an equimolar amount of 2,5-dimethyl-hexane-2,5-diol for the 2,5-dimethyl-hex-3-yne-2,5-diol in the procedure of Example 3, the product 3,3,6,6,9,9,12,12-octamethyl - 1,2,7,8 - tetra - oxa-cyclododec-4-yne of the formula

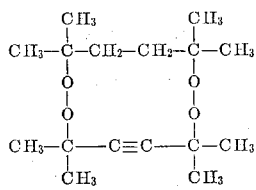

is obtained, the properties of which correspond to a considerable extent with those of the compound of Example 3.

Example 5

125 g. of the disodium salt of 2,5-dimethyl-2,5-dihydro-peroxy-hexane and 153 g. 2,5-dimethyl-2,5-dibromo-hexane (prepared as described in Harries, Annalen 343 (1905), page 365) are introduced together, in the course of ten hours while stirring at 60° C., to 700 cc. of dioxane diluted with 100 cc. water. Thereafter, stirring was continued for an additional four hours at 70° C.

Precipitated sodium bromide is filtered off and the reaction solution is concentrated under reduced pressure at 40° C. over a water bath to form a distillate of about 400 cc. The residue is diluted with 500 cc. water and the oil that is separated is taken up in pentane. After the resulting pentane solution is purified with soda lye and sodium hydroxide, the pentane is distilled off and the residue is fractionated. The oil that is distilled over at 30 to 60° C. at 0.66 mm. Hg crystallizes. After dilution with methanol in a ratio of 1:1 and extended cooling at —20° C., the crystalline portions are filtered off and recrystallized from methanol.

The resulting 3,3,6,6,9,9,12,12-octamethyl-1,2,7,8-tetraoxacyclododecane is a white, crystalline product melting, with decomposition, at 157–158° C., containing 10.7% active oxygen (theoretical 11.09%) as found by iodometric peroxide determination, and having the formula

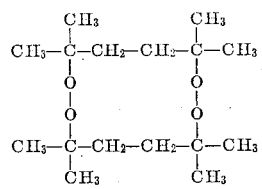

According to the method of Horner and Jürgens, the compound is characterized as a dialkyl peroxide. On analysis, it was found to contain: C, 66.72% (calc. 66.62%); H, 11.18% (calc. 11.18%). It is readily soluble at 20° C. in benzine, benzene, ether, acetone, acetic acid ester, halogenated hydrocarbons, glacial acetic acid and ethanol, slightly soluble in methanol, insoluble in water. The half-life of the compound, determined in tetralin, is 3½ hours at 140° C.

Example 6

100 g. of 2,5-dimethyl-2,5-dihydro-peroxy-hex-3-yne and 82.3 g. trans-2,5-dimethylhex-3-ene-2,5-diol (prepared as described by Alder and Von Brachel in Annalen 608 (1957), page 214) are introduced together, in the course of 18 hours while stirring at 50° C., to a solution of 10 g. p-toluene sulfonic acid in 1000 cc. glacial acetic acid. Thereafter, stirring is continued for an additional two hours at 60° C. to insure completion of the reaction.

The volume of the reaction solution is reduced to about one-third by heating in a 40° C. water bath under reduced pressure, and then diluted with one liter water. The oil thus separated is taken up in pentane, shaken with 40% soda lye and then stirred twice, three hours each with finely powdered sodium hydroxide.

After filtration thereof and distilling off the pentane under a weak vacuum, the residue is fractionated. The oil that is distilled over at 35 to 60° C. at 0.03 mm. Hg is light yellow. Crystals are precipitated in the cooler and recrystallized from methanol.

The resulting 3,3,6,6,9,9,12,12-octamethyl-1,2,7,8-tetraoxacyclododec-4-ene-10-yne is a white crystalline product with a melting point of 142–144° C. and a decomposition point at 161° C. It contains 11.4% active oxygen (theor. 11.3%) as found by iodometric peroxide determination and has the formula:

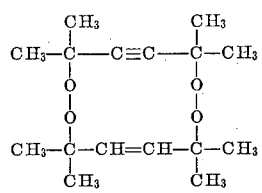

According to the method of Horner and Jürgens, the compound is characterized as a dialkyl peroxide. It is readily soluble at 20° C. in benzene, ether, acetone, acetic acid esters, halogenated hydrocarbons, glacial acetic acid and ethanol, slightly soluble in benzine and methanol, and insoluble in water. The half-life of the compound, determined in tetralin, is more than ten hours at 140° C. and thirty minutes at 160° C.

Example 7

A mixture of 100 g. 2,5-dimethyl-2,5-dihydroperoxy-hex-3-yne and 97.6 g. 3,6-dimethyloct-4-yne-3,6-diol is introduced, in the course of nine hours while stirring well at 40° C., to a mixture of 1000 cc. glacial acetic acid and 20 g. concentrated sulfuric acid. After three hours of warming and stirring at 50° C. the reaction is broken off.

After neutralization of the sulfuric acid with 70 g. sodium acetate-trihydrate, the volume of the reaction solution is reduced to about one-third the initial volume and diluted with 200 to 250 cc. water. By standing at 0° C., an oil separates, which gradually crystallizes. The crystals are filtered off and recrystallized from methanol.

The resulting 3,6,9,9,12,12-hexamethyl-3,6-diethyl-1,2,7,8-tetra-oxacyclododeca-4,10-diyne is a white ,crystalline product with a melting point of 93–95° C. and a decomposition point at 171° C. It contains 10.3% active oxygen (theor. 10.4%) as found by iodometric peroxide determination and has the formula

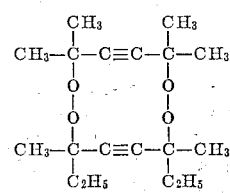

On analysis, it was found to contain: C, 69.76% (calc. 70.09%); H, 9.10% (calc. 9.15%).

According to the method of Horner and Jürgens, the compound is a dialkyl peroxide. It is readily soluble in benzene, ether, benzine, acetic acid esters, acetone, halogenated hydrocarbons and ethanol, less soluble in methanol, and insoluble in water. The half-life of the compound, determined in tetralin, is 8½ hours at 160° C.

Example 8

The compound of Example 4 is also obtainable in the following manner:

100 g. of 2,5-dimethyl-2,5-dihydro-peroxyhex-3-yne and 84 g. 2,5-dimethyl-hexane-2,5-diol (in a molar ratio of 1:1) are introduced together, in the course of eight hours while stirring at 50° C., to a mixture of 800 g. dioxane and 200 g. of 100% phosphoric acid. The reaction is completed by two additional hours of stirring at 60° C.

The reaction solution is subjected to reduced pressure over a water bath at about 40° C. to distill off about 400 cc. dioxane. The residue is then diluted with 600 cc. water while cooling with ice. The oil that separates is taken up in pentane. To remove hydroperoxidic by-products, this is shaken twice with 40% soda lye while cooling and then stirred for three hours with finely powdered sodium hydroxide.

After filtration, the pentane is removed under vacuum and the remainder is diluted with an equal amount of methanol. White crystals separate out by cooling to −20° C. These are filtered off, the methanol is distilled off and the oily residue is subjected to distillation under a vacuum. At 0.04 mm. Hg a yellow oil is distilled over at 40 to 75° C. from which, after dilution with an equal amount of methanol and cooling to about −20° C., a further product crystallizes. Both crystallized products are recrystallized from methanol.

The resulting product is a white, crystalline substance having a melting point of 133–134° C. and a decomposition temperature of 172° C. It contains 11.2% active oxygen (theoretical 11.2%) as found by iodometric peroxide determination. On analysis, it was found to contain: C, 67.56% (calc. 67.57%); H, 9.60% (calc. 9.93%).

According to the method of Horner and Jürgens, the compound is characterized as a dialkyl peroxide. It is readily soluble at 20° C. in benzene, ether, benzine, acetone, acetic acid esters, halogenated hydrocarbons and glacial acetic acid, slightly soluble in ethanol and methanol, and insoluble in water. The half-life of the compound, determined in tetralin, is twelve hours at 140° C. and five hours at 160° C.

Example 9

100 g. of 2,5-dimethyl-2,5-dihydroperoxyhex-2-yne and (an equimolar amount) 63.2 g. of 2,5-dimethylhexa-1,5-diene (prepared as described by Nazarow and Mawrow, Chem. Zentralblatt (1959) pages 14,387-8), are introduced together, in the course of 15 hours while stirring well at 30° C., to a mixture of 500 cc. dichloromethane and 2 g. 70% perchloric acid, two additional grams of 70% perchloric acid being added every five hours. An additional seven hours of stirring at 40° C. insures completion of the reaction.

To remove the perchloric acid, the dichloromethane reaction solution is subjected to distillation at 40° C. under a vacuum and the residue is diluted with 600 cc. water while cooling with ice. The oil that separates is taken up in pentane. To remove hydroperoxidic byproducts, this is shaken twice with 40% soda lye while cooling and then stirred for three hours with finely powdered sodium hydroxide.

After filtration, the procedure is identical with that in the fourth paragraph of Example 8 to yield a product identical with that described in the last two paragraphs of Example 8.

The identical product is also obtained and the same procedure is employed when 63.2 g. of 2,5-dimethylhexa-2,4-diene (prepared as described by Harper, Reed and Thompson, J. Sci. Food Agric., volume 2 (1951) pages 95–100) or a mixture thereof with 2,5-dimethylhexa-1,5-diene is used in place of 2,5-dimethyl-hexa-1,5-diene alone.

Example 10

100 g. 2,5-dimethyl - 2,5 - dihydro-peroxy-hexane and 61.7 g. 2,5-dimethyl-1,5-hexadiene (or 2,5-dimethyl-2,4-hexadiene or a mixture of the two isomers) are simultaneously added, in the course of 15 hours, to a well stirred mixture of 500 cc. dichloromethane and 7 g. of a solution of 10 g. 70% perchloric acid in a 25 cc. glacial acetic acid. An additional two hours of stirring at 35° C. insures completion of the reaction.

The remainder of the procedure is identical with that described in Example 9.

The resulting product, 3,3,6,6,9,9,12,12-octamethyl-1,2,7,8-tetraoxacyclododecane, is a white, crystalline substance which decomposes at its melting point of 157–158° C. It contains 10.7% active oxygen (theoretical 11.09%) as found by iodometric peroxide determination.

On analysis, it was found to contain: C, 66.72% (calc. 66.61%); H, 11.18% (calc. 11.18%).

According to the method of Horner and Jürgens, the compound is characterized as a dialkyl peroxide. It is readily soluble in benzine, benzene, ether, acetone, acetic acid esters, halogenated hydrocarbons, glacial acetic acid and ethanol, slightly soluble in methanol, and insoluble in water. The half-life of the compound, determined in tetralin, is 3½ hours at 140° C.

We claim:
1. Organic peroxides selected from the group consisting of:

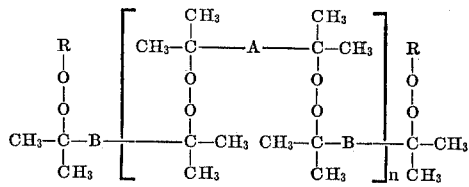

and

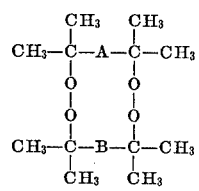

wherein A and B represent members selected from the group consisting of —CH$_2$—CH$_2$—, —CH=CH— and —C≡C—, R represents a tertiary lower alkyl, and $n$ represents an integer from 1 to 5, inclusive.

2. Organic peroxides of the formula

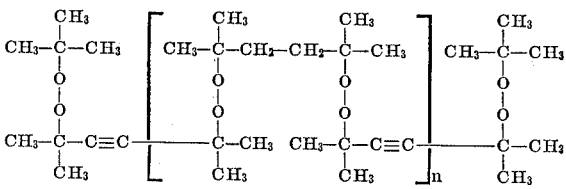

in which $n$ is 1 to 5.

3. Organic peroxides of the formula

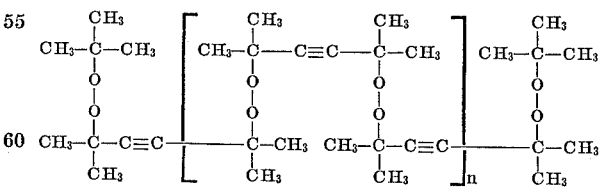

in which $n$ is 1 to 5.

4. Organic peroxides of the formula

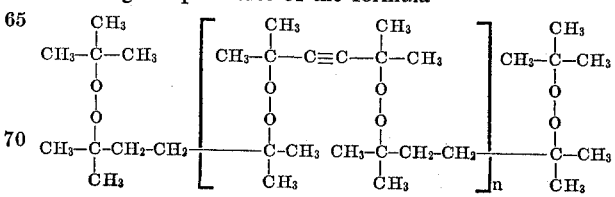

in which $n$ is 1 to 5.

5. 3,3,6,6,9,9,12,12 - octamethyl - 1,2,7,8 - tetra - oxacyclododeca-4,10-diyne.

6. 3,3,6,6,9,9,12,12 - octamethyl - 1,2,7,8 - tetra - oxa-cyclododec-4-yne.

7. 3,3,6,6,9,9,12,12 - octamethyl - 1,2,7,8 - tetra - oxa-cyclododecane.

8. 3,3,6,6,9,9,12,12 - octamethyl - 1,2,7,8 - tetra - oxa-cyclododec-4-ene-10-yne.

9. 3,6,9,9,12,12 - hexamethyl - 3,6 - diethyl - 1,2,7,8-tetra-oxa-cyclododeca-4,10-diyne.

References Cited

Hawkins: Organic Peroxides (1961), pp. 19, 261, 292, 293.

NORMA S. MILESTONE, *Primary Examiner*.

U.S. Cl. X.R.

260—610, 783, 784, 768